United States Patent
Nishimoto et al.

(10) Patent No.: US 11,962,051 B2
(45) Date of Patent: Apr. 16, 2024

(54) ELECTROLYTE MATERIAL FOR SOLID OXIDE FUEL CELL AND METHOD FOR PRODUCING PRECURSOR THEREFOR

(71) Applicant: SAKAI CHEMICAL INDUSTRY CO., LTD., Osaka (JP)

(72) Inventors: Takuma Nishimoto, Osaka (JP); Kazuya Miyasaka, Osaka (JP); Minoru Yoneda, Osaka (JP)

(73) Assignee: SAKAI CHEMICAL INDUSTRY CO., LTD., Osaka (JP)

(*) Notice: Subject to any disclaimer, the term of this patent is extended or adjusted under 35 U.S.C. 154(b) by 595 days.

(21) Appl. No.: 17/268,692

(22) PCT Filed: Aug. 28, 2019

(86) PCT No.: PCT/JP2019/033818
§ 371 (c)(1),
(2) Date: Feb. 16, 2021

(87) PCT Pub. No.: WO2020/045540
PCT Pub. Date: Mar. 5, 2020

(65) Prior Publication Data
US 2021/0234183 A1    Jul. 29, 2021

(30) Foreign Application Priority Data
Aug. 30, 2018  (JP) ................... 2018-161058

(51) Int. Cl.
*H01M 8/1253* (2016.01)
*H01M 8/12* (2016.01)

(52) U.S. Cl.
CPC .. *H01M 8/1253* (2013.01); *H01M 2008/1293* (2013.01)

(58) Field of Classification Search
CPC .................................. H01M 8/1253
See application file for complete search history.

(56) References Cited

U.S. PATENT DOCUMENTS

| | | | |
|---|---|---|---|
| 5,244,753 A | 9/1993 | Taniguchi et al. | |
| 7,767,608 B2 | 8/2010 | Nishigaki et al. | |
| 2006/0133988 A1* | 6/2006 | Kurozumi | C01G 23/003 423/598 |
| 2008/0044344 A1 | 2/2008 | Shikida et al. | |
| 2015/0053898 A1 | 2/2015 | Nada et al. | |
| 2016/0003767 A1 | 1/2016 | Takeuchi et al. | |
| 2016/0164108 A1 | 6/2016 | Matsuno et al. | |
| 2017/0317371 A1 | 11/2017 | Higashino et al. | |
| 2018/0037508 A1* | 2/2018 | Higashino | C04B 35/486 |
| 2018/0375114 A1* | 12/2018 | Higashino | C01G 25/02 |
| 2019/0006692 A1 | 1/2019 | Higashino et al. | |
| 2019/0088968 A1 | 3/2019 | Fujisaki et al. | |

FOREIGN PATENT DOCUMENTS

| | | |
|---|---|---|
| CN | 105378996 | 3/2016 |
| CN | 107112564 | 8/2017 |
| CN | 107406332 | 11/2017 |
| CN | 107925095 | 4/2018 |
| CN | 108370041 | 8/2018 |
| JP | 5-43240 | 2/1993 |
| JP | 2007-137697 | 6/2007 |
| JP | 2009-35447 | 2/2009 |
| JP | 2011-190149 | 9/2011 |
| JP | 2013-206702 | 10/2013 |
| JP | 2015-41597 | 3/2015 |
| JP | 2016-26987 | 2/2016 |
| JP | 2017-188439 | 10/2017 |
| JP | 2018-37158 | 3/2018 |
| JP | 2018-116936 | 7/2018 |
| TW | I331135 | 10/2010 |

OTHER PUBLICATIONS

International Search Report (ISR) dated Nov. 26, 2019 in International (PCT) Application No. PCT/JP2019/033818.

* cited by examiner

*Primary Examiner* — Karie O'Neill Apicella

(74) *Attorney, Agent, or Firm* — Wenderoth, Lind & Ponack, L.L.P.

(57) ABSTRACT

The invention provides an electrolyte material for a solid oxide fuel cell comprising a perovskite oxide comprising at least one element A selected from the group consisting of Ba and Sr, an element Zr, at least one element M selected from the group consisting of Y and Yb, and oxygen, and also a solid phase method for producing the electrolyte material.

14 Claims, No Drawings

ELECTROLYTE MATERIAL FOR SOLID OXIDE FUEL CELL AND METHOD FOR PRODUCING PRECURSOR THEREFOR

TECHNICAL FIELD

The present invention relates to an electrolyte material for a solid oxide fuel cell. More particularly, the invention relates to a method for producing an electrolyte material which comprises a powder of barium zirconate-based perovskite oxide with less segregation of doping elements obtained by firing at a low temperature, that is, at a temperature of 1600° C. or less, in a firing furnace with a low load by a solid phase method. The invention further relates to a method for producing a precursor for the electrolyte material.

BACKGROUND

In recent years, fuel cells have been attracting attention as a clean energy source. Among them, a solid oxide fuel cell (hereinafter sometimes referred to as SOFC) using as an electrolyte a solid oxide having an ion conductivity works at high temperatures in the range of about 800° C. to 1000° C. and thus has a high power generation efficiency. It has an advantage that some kind of hydrocarbons or carbon monoxide gas can be utilized as a fuel, and in addition, that the high temperature exhaust heat generated from the fuel cells can be made use of. Thus, it is expected to have a wide range of applications from household use to large-scale power generation. Some have already been put to practical use.

As is well known, the SOFC includes a unit cell as a basic structure in which a solid oxide electrolyte layer is arranged between an air electrode (cathode) and a fuel electrode (anode). If necessary, the SOFC has a reaction preventive layer (also called an intermediate layer or a barrier layer) between the air electrode and the electrolyte layer for preventing reactions between them.

The air electrode is formed, for example, by making a powder of air electrode material into a paste with a resin solution, applying the paste to an electrolyte layer to form a green layer, and sintering the green layer.

Conventionally, a sintered body of yttria-stabilized zirconia, for example, has been typically used as an electrolyte layer. A perovskite composite oxide having an electron conductivity and an ion conductivity, and an $ABO_3$ structure, for example, $(La, Sr)(Co, Fe)O_3$, has recently come to be used as an air electrode in order to increase the output of SOFC (see, for example, Patent Literature 1).

In recent years, a powder of barium zirconate-based perovskite oxide (BZM), represented by $BaZr_{1-x}M_xO_{3-\delta}$ wherein the element M is an element Y or Yb, is expected as an electrolyte material for a medium-to-low temperature operating SOFC as it has a good proton conductivity at medium-to-low temperatures of 700° C. or lower.

As a solid phase method for producing a barium zirconate-based perovskite-type oxide, for example, one for producing an yttrium doped barium zirconate is known in which barium carbonate, zirconium oxide and yttrium oxide are used as raw materials (see Patent Literature 2). However, no description is found therein about the segregation of yttrium in the obtained yttrium doped barium zirconate.

Also known is a liquid phase method for producing a barium zirconate-based perovskite oxide (BZM) (see Patent Literature 3). This liquid phase method is superior to the solid phase method in that the segregation of doping elements is less, but it has a problem that it is not suitable for mass production because of high cost of the raw materials. As described above, in order to put the SOFC to practical use it has been a challenge to achieve both the uniformity of the composition of the barium zirconate-based perovskite oxide (BZM) for ensuring its reliability and the cost reduction in mass production of the barium zirconate-based perovskite oxide (BZM) for realizing its widespread use.

PRIOR ART

Patent Literature

Patent literature 1: JP 2009-36447A
Patent literature 2: JP 2018-206702A
Patent literature 3: JP 2017-188439A

SUMMARY OF INVENTION

Technical Problem

The invention has been made in order to solve the above-mentioned problems in the production of barium zirconate-based perovskite oxide (BZM). Thus, it is an object of the invention to provide an electrolyte material for a solid oxide fuel cell comprising a powder of a barium zirconate-based perovskite oxide which has a uniform composition and a less amount of segregation of doping elements, and which is obtained by firing starting materials at a lower temperature at which a load of a firing furnace is low, that is, at a temperature of 1500° C. or less, by a solid phase method. It is also an object of the invention to provide a method for producing the electrolyte material for a solid oxide fuel cell. It is a further object of the invention to provide a method for producing a precursor for the electrolyte material for a solid oxide fuel cell.

Solution to Problem

The invention provides a method for producing a precursor for an electrolyte material for a solid oxide fuel cell comprising a perovskite oxide comprising at least one element A selected from the group consisting of Ba and Sr, an element Zr, at least one element M selected from the group consisting of Y and Yb, and oxygen, the method comprising:
when obtaining a precursor by grinding and mixing starting materials composed of basic zirconium carbonate as a starting material of the element Zr, and a first and a second solid starting material containing the element A and the element M, respectively, grinding and mixing the starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less.

The invention also provides a method for producing the electrolyte material for a solid oxide fuel cell, the method comprising obtaining a precursor by the above-described method, and firing and pulverizing the precursor.

In the invention, the perovskite oxide is preferably represented by the composition formula (I):

$$A_aZr_{1-x}M_xO_{3-\delta}$$

wherein the element A is at least one element selected from the group consisting of Ba and Sr, the element M is at least one element selected from the group consisting of Y and Yb. and a and x are each a number fulfilling the conditions, 0.90≤a≤1.05 and 0.05≤x≤0.3, respectively.

In addition, the invention further provides an electrolyte material for a solid oxide fuel cell comprising a perovskite oxide represented by the above-mentioned formula (I),
wherein the number of segregation regions of the element M evaluated based on the element mapping data that is obtained by the SEM-EDS method is 1 or less,
wherein the number of segregation regions of the element M is determined as follows: the resolution of the element mapping data is converted to a resolution of 128 by 96 pixels wherein the area of 1 pixel is 0.094 µm by 0.094 µm; the region where 5 or more pixels each having a value of 0.6 or more are each in contact with another with its side is regarded as a segregation region of the element M, wherein the value is obtained by dividing the characteristic X-ray intensity of the element M in each pixel in the mapping data by the maximum X-ray intensity of the element M in the mapping data, and the number of the segregation regions is counted.

Hereinafter, the invention relating to the electrolyte material for a solid oxide fuel cell comprising a perovskite oxide represented by the composition formula (I) and a precursor therefor may be referred to as the first invention.

In addition to the first invention, the invention also provides an electrolyte material for a solid oxide fuel cell comprising a perovskite oxide represented by the composition formula (I) in which an element cerium further substitutes for a part of the element zirconium in the perovskite oxide, and a method for producing a precursor therefor as well as a method for producing an electrolyte material for a solid oxide fuel cell using the precursor.

Thus, the invention also provides a method for producing a precursor for an electrolyte material for a solid oxide fuel cell comprising a perovskite oxide comprising at least one element A selected from the group consisting of Ba and Sr, an element Zr, an element Ce, at least one element M selected from the group consisting of Y and Yb, and oxygen, the method comprising:
when obtaining a precursor by grinding and mixing starting materials composed of basic zirconium carbonate as a starting material of the element Zr, and a first, a second and a third solid starting material containing the element A, the element Ce and the element M, respectively, grinding and mixing the starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 µm or less.

The invention further provides a method for producing an electrolyte material for a solid oxide fuel cell comprising firing and pulverizing the thus obtained precursor.

In the above described invention, the perovskite type oxide is represented preferably by the composition formula (II)

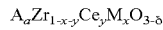

wherein the element A is at least one element selected from the group consisting of Ba and Sr, the element M is at least one element selected from the group consisting of Y and Yb, and a, x and y are each a number fulfilling the conditions, 0.90≤a≤1.05, 0.05≤x≤0.3, and 0.05≤y≤0.5, respectively.

The invention further provides an electrolyte material for a solid oxide fuel cell comprising a perovskite oxide represented by the above-mentioned formula (II)
wherein the number of segregation regions of the element M evaluated based on the element mapping data that is obtained by the SEM-EDS method is 1 or less,
wherein the number of segregation regions of the element M is determined as follows: the resolution of the element mapping data is converted to a resolution of 128 by 96 pixels wherein the area of 1 pixel is 0.094 µm by 0.094 µm; the region where 5 or more pixels each having a value of 0.6 or more are each in contact with another with its side is regarded as a segregation region of the element M, wherein the value is obtained by dividing the characteristic X-ray intensity of the element M in each pixel in the mapping data by the maximum X-ray intensity of the element M in the mapping data, and the number of the regions is counted.

Hereinafter, the invention relating to the electrolyte material for a solid oxide fuel cell comprising a perovskite oxide represented by the composition formula (II) and a precursor therefor may be referred to as the second invention.

In the specification, "δ" described in the composition formulas (I) and (II) represents an oxygen deficiency amount and can take different values depending on the composition, temperature, atmosphere, etc. It is an amount that does not make sense to specify.

Advantageous Effect of Invention

According to the first invention, when the solid starting materials composed of basic zirconium carbonate, barium carbonate or strontium carbonate, and a starting material containing the doping element M are ground and mixed together by a wet method or a dry method, the solid starting materials undergo a mechanochemical reaction to provide a precursor having a uniform composition. Thus, the precursor is fired at a temperature as low as 1500° C. or less to provide an electrolyte material for a solid oxide fuel cell comprising a perovskite oxide more uniform in composition and less in segregation of the doping elements.

According to the second invention, when the solid starting materials composed of basic zirconium carbonate, a starting material containing an element cerium, barium carbonate or strontium carbonate, and a starting material containing the doping element M are ground and mixed by a wet or dry method, the solid starting materials undergo a mechanochemical reaction, and as a result, a precursor having a uniform composition is obtained. Then, the firing of this precursor at a low temperature of 1500° C. or less provides an electrolyte material for a solid oxide fuel cell comprising a barium zirconate-based perovskite oxide containing cerium and uniform in composition and reduced in segregation of the doping elements.

Further, according to the invention, either the first or the second, the precursor is fired at a low temperature to obtain an electrolyte material. As a result, the electrolyte material is obtained in the form of fine particles with reducing the generation of coarse particles. In addition, the electrolyte material obtained by the invention has a less segregation of the doping elements so that it is superior in proton conductivity.

Further effects of the second invention are as follows. Barium zirconate-based perovskite oxides are generally difficult to sinter; however, as they contain cerium, they are improved in sinterability, and thus they are expected to be improved in proton conductivity due to reduction of grain boundary resistance and reduced in sintering temperatures.

As described above, a solid oxide fuel cell usually has an intermediate layer in order to prevent the reaction at the interface between the electrode and the electrolyte, and in many cases, a cerium-based material is used in the intermediate layer. In a solid oxide fuel cell, the peeling or poor joining at the interfaces between dissimilar substances are often problematic. Thus, as a further effect of the invention, as the electrolyte material contains cerium, it is expected that the joinability at the interface between the intermediate layer containing the cerium-based material and the electrolyte is improved.

EMBODIMENTS OF INVENTION

The method for producing a precursor for an electrolyte material for a solid oxide fuel cell comprising a perovskite oxide comprising at least one element A selected from the group consisting of Ba and Sr, an element Zr, at least one element M selected from the group consisting of Y and Yb, and oxygen according to the first invention, the method comprising:
  when obtaining a precursor by grinding and mixing solid starting materials composed of basic zirconium carbonate as a starting material of the element Zr, and a first and a second starting material containing the element A and the element M, respectively, grinding and mixing the solid starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less.

The method for producing an electrolyte material for a solid oxide fuel cell according to the first invention comprises obtaining the precursor for an electrolyte material as described above, and firing and pulverizing the precursor.

In the first invention, the perovskite oxide is preferably represented by the composition formula (I):

$$A_a Zr_{1-x} M_x O_{3-\delta}$$

wherein the element A is at least one element selected from the group consisting of Ba and Sr, the element M is at least one element selected from the group consisting of Y and Yb, and a and x are each a number fulfilling the conditions, $0.90 \leq a \leq 1.05$ and $0.05 \leq x \leq 0.3$, respectively.

According to the first invention, when x is in the range mentioned above in the composition formula (I), a perovskite oxide superior in proton conductivity is obtained as a single phase oxide. Further, from the viewpoint of progress of the mechanochemical reaction, x is preferably in the range of 0.05 to 0.25, and in particular preferably in the range of 0.1 to 0.23.

Also according to the invention, a is preferably in the range of 0.90 to 1.00, in particular, in the range of 0.93 to 0.98, in the above composition formula, from the viewpoint of reducing the formation of a crystal phase other than the perovskite crystal structure which has no proton conductivity.

In the method for producing the precursor according to the invention, it is essential to use basic zirconium carbonate as a solid starting material containing zirconium. Even if a zirconium raw material other than basic zirconium carbonate is ground and mixed together with solid starting materials containing the element A and element M, a mechanochemical reaction does not occur, and a precursor having a uniform composition according to the invention is not obtained, although the reason is not necessarily clear.

The mechanochemical reaction is a phenomenon in which when a solid particle is given mechanical energy, the crystal structure of the solid particle is changed or the surface is activated, and the solid particle chemically reacts with surrounding substances. The mechanical energy refers to energy given by impact, compression, shear, shear stress, friction and the like. For example, a mechanochemical reaction can be generated by mixing and grinding solid particles while giving mechanical energy to the particles with an impact crushing device such as a bead mill.

The impact crushing device used in the invention is not particularly limited as long as it can cause a mechanochemical reaction between the solid particles. Examples of the device include a planetary ball mill, a bead mill, a ball mill, a cutter mill, a hammer mill, a jet mill and the like. Among these listed, a planetary ball mill, a bead mill or the like are particularly preferred from the viewpoint that they can perform the mechanochemical treatment and the grinding treatment at the same time.

When the mechanochemical treatment is carried out with a planetary ball mill or a bead mill, the size of the grinding media is preferably 0.01 mm or more in diameter, more preferably 0.1 mm or more, and usually 50 mm or less. The material for the grinding media is preferably zirconia, zircon, agate, alumina, tungsten carbide, iron, stainless steel, glass, etc. Particularly preferable is zirconia or alumina from the viewpoint that it makes it possible to perform mechanochemical treatment and grinding treatment at the same time, but also from the viewpoint of abrasion of particles with the grinding media.

The element A is at least one element selected from the group consisting of Ba and Sr. The solid starting material containing the element A is preferably a crystalline carbonate because it is easy to handle and inexpensive. Therefore, barium carbonate is preferable when the element A is Ba, and strontium carbonate is preferable when the element A is Sr. It is already known that barium carbonate and strontium carbonate similarly react in the production of barium zirconate or strontium zirconate by a solid phase method. It is also already known that $BaZrMO_{3-\delta}$ 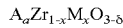 and $SrZrMO_{3-\delta}$ have a similar proton conductivity.

The solid starting material containing the doping element M, that is, at least one selected from the group consisting of Y and Yb, is preferably a carbonate or an oxides which is easy to handle and inexpensive. It may be either crystalline or amorphous.

In order to obtain the precursor for an electrolyte material by grinding and mixing the solid starting materials containing the elements Zr, A and M according to the method of the invention, it is necessary that the first condition is fulfilled, that is, the solid starting materials are mixed and ground to provide a mixture, i.e., the resulting precursor of which the intensity of main diffraction line derived from the starting material of the element M in the X-ray diffraction pattern of the resulting precursor is 3% or less of the intensity of main diffraction line derived from the starting material of the element A, and in addition, the second condition is fulfilled, that is, the median value (D50) in the particle size distribution of the resulting precursor, is 1 μm or less.

If at least one of the first and second conditions is not fulfilled, a precursor having a uniform composition according to the present invention is not obtained. Although the reason is not necessarily clear, but if the first condition is not fulfilled, it is believed that the mechanochemical reaction has not sufficiently occurred on much of the solid starting materials, while if the second condition is not satisfied, it is believed that the solid starting materials have been only insufficiently ground.

Further, when at least one of the first and second conditions is not fulfilled, and the obtained precursor is fired, an electrolyte material with less segregation of the doping elements is not obtained.

As long as both the first and second conditions are fulfilled, the solid starting materials may be mixed and ground either in a wet method or in a dry method.

According to the invention, when amorphous basic zirconium carbonate as a solid starting material containing zirconium, a solid starting material containing the element A, and a solid starting material containing the doping element M are ground and mixed to provide a precursor which fulfills the conditions mentioned hereinbefore, as the solid starting material containing the element M is a crystalline carbonate (for example, yttrium carbonate) or a crystalline oxide (for example, yttrium oxide), the XRD peaks derived from the crystalline carbonates or crystalline oxides are reduced, it is confirmed that the solid starting raw materials containing the basic zirconium carbonate undergo the mechanochemical reaction with each of the solid starting materials containing the element A and the element M.

However, when the solid starting material containing the element M is ytterbium carbonate, as the carbonate is amorphous, the first condition that the intensity of main diffraction line derived from the starting material of the element M in the X-ray diffraction pattern of the obtained precursor is 3% or less of the intensity of main diffraction line derived from the starting material containing the element A is already fulfilled before the solid starting materials are ground and mixed. Accordingly, in this case, it s a substantial condition for obtaining the desired precursor according to the invention that the solid starting materials are ground and mixed until the resulting mixture, i.e., the resulting precursor, comes to have the median value (D50) in the particle size distribution to be 1 μm or less.

According to the first invention to produce an electrolyte material for a solid oxide fuel cell, the precursor is obtained as described above, and then the precursor is fired and pulverized.

The firing temperature is usually in the range of 1100 to 1500° C. According to the invention, an electrolyte material with less segregation of the doping element M is obtained by obtaining the precursor, and firing and pulverizing it.

The means and methods for pulverizing the fired precursor are not particularly limited, and any appropriate means and methods are adopted.

The method for producing a precursor for a solid oxide fuel cell electrolyte material comprising a perovskite oxide comprising at least one element A selected from the group consisting of Ba and Sr, an element Zr, an element Ce, at least one element M selected from the group consisting of Y and Yb, and oxygen according to the second invention comprises:

when obtaining a precursor by grinding and mixing solid starting materials composed of basic zirconium carbonate as a starting material of the element Zr, and a first, a second and a third solid starting material containing the element A, the element Ce and the element M, respectively, grinding and mixing the solid starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less.

According to the second invention to produce an electrolyte material for a solid oxide fuel cell, the precursor is obtained as described above, and then the precursor is fired and pulverized.

The firing temperature is usually in the range of 1100 to 1500° C. According to the invention, an electrolyte material with less segregation of the doping element M is obtained by obtaining the precursor, and firing and pulverizing it.

The means and methods for pulverizing the fired precursor are not particularly limited, and any appropriate means and methods are adopted.

According to the second invention, the perovskite oxide is represented preferably by the composition formula (II)

$$A_a Zr_{1-x-y} Ce_y M_x O_{3-\delta}$$

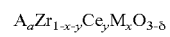

wherein the element A is at least one element selected from the group consisting of Ba and Sr, the element M is at least one element selected from the group consisting of Y and Yb, and a, x and y are each an number fulfilling the conditions: $0.90 \leq a \leq 1.05$, $0.05 \leq x \leq 0.3$, and $0.05 \leq y \leq 0.5$, respectively.

As described above, the second invention uses the solid starting materials composed of a starting material containing the element Ce in addition to basic zirconium carbonate, and the starting materials containing the element A and the element M, and otherwise in the same manner as in the first invention.

The basic zirconium carbonate and the starting materials for the element A and the doping element M are already set out hereinbefore. Further, x and a in the composition formula (II) are also set out hereinbefore.

The solid starting material containing cerium used in the second invention may be either crystalline or amorphous, and therefore, for example, either crystalline cerium oxide or amorphous cerium hydroxide may be used.

As described above, when the perovskite oxide used for an electrolyte material for a solid oxide fuel cell contains cerium, the electrolyte material is improved in sinterability. When the intermediate layer in the solid oxide fuel cell contains a cerium-based material, the joinability at the interface between the intermediate layer and the electrolyte is also improved. At any rate, y in the above composition formula (II) is preferably in the range of 0.1 to 0.5, and particularly preferably in the range of 0.1 to 0.4 so that the perovskite oxide obtained has a superior proton conductivity, and at the same time it has stability against gases (such as water vapor, carbon dioxide, etc.) as it is exposed with such gases during a fuel cell is operated.

The electrolyte material for a solid oxide fuel cell according to the second invention comprises zirconate-based perovskite oxide in which a part of the element Zr is further replaced with the element Ce. Thus, it has various preferable effects as an electrolyte material for a solid oxide fuel cell.

The method for producing an electrolyte material for a solid oxide fuel cell according to the second invention comprises obtaining a precursor as described above, and then the precursor is fired and pulverized.

The electrolyte material for a solid oxide fuel cell obtained according to the invention as described above comprises the perovskite oxide represented by the composition formula (I) or (II) of which the number of segregated regions of the element M evaluated based on the element mapping data by the SEM-EDS method is 1 or less.

The number of segregation regions of the element M is determined as follows: the resolution of the element mapping data is converted to a resolution of 128 by 96 pixels wherein the area of 1 pixel is 0.094 μm by 0.094 μm; the region where 5 or more pixels each having a value of 0.6 or more are each in contact with another with its side wherein the value is obtained by dividing the characteristic X-ray intensity of the element M in each pixel in the mapping data by the maximum X-ray intensity of the element M in the mapping data, is regarded as a segregation region of the element M, and the number of the regions is counted.

Thus, the electrolyte material according to the invention has less segregation of the doping elements and is superior in proton conductivity.

EXAMPLES

Hereinafter, a solid starting material containing the element A may be referred to as an A source, a solid starting material containing the element Zr may be referred to as a Zr source, a solid starting material containing the element M may be referred to as an M source, and a solid starting material containing the element Ce may be referred to as a Ce source.

Example 1

63.61 g of barium carbonate (manufactured by Wako Pure Chemical Industries, Ltd. and having a purity of 99.5% by weight, the same hereinafter), 73.03 g of basic zirconium carbonate (manufactured by Wako Pure Chemical Industries, Ltd. and having a purity 43.8% by weight in terms of $ZrO_2$, the same hereinafter), and 13.36 g of ytterbium oxide (manufactured by Wako Pure Chemical Industries, Ltd. and having a purity of 99.7% by weight, the same hereinafter) were each weighed, put in water and stirred to prepare a slurry. A part of the slurry was sampled and the median value (D50) in the particle size distribution was measured under the conditions described hereinafter using a laser diffraction/scattering particle size distribution meter (MT-3300EXII manufactured by Mierotrac BEL Corp. The D50 value was 16 μm.

The sampled slurry was dried in a dryer at a temperature of 150° C. and an X-ray diffraction pattern was measured using a powder X-ray diffractometer (manufactured by Rigaku Corporation, intense X-ray diffractometer RINT-TTR III in which a sample for measurement was held horizontally) under the conditions described hereinafter. The intensity in the vicinity of the main diffraction line (in the vicinity of 2θ=29°) derived from the M source, or ytterbium oxide, was found to be 45% of that of the main diffraction line derived from the A source, i.e., barium carbonate (in the vicinity of 2θ=24°).

Thereafter, the slurry was dispersed, crushed and mixed using a planetary ball mill (P-5 manufactured by Fritsch Ltd.) at a rotation speed of 180 rpm for 120 minutes using zirconia beads having a diameter of 1 mm as a grinding medium. Then, as the resulting slurry was evaluated in the same manner as described hereinbefore, the median value (D50) in the particle size distribution was 0.52 μm, and it was confirmed that the main diffraction line (in the vicinity of 2θ=29°) derived from ytterbium oxide as the M source disappeared (that is, the intensity of the diffraction line of the M source/the A source=0%).

After the beads in the slurry thus treated were removed using a sieve, and the slurry was dried in a dryer at a temperature of 150° C., the resulting solid was crushed with a sample mill to obtain a precursor for an electrolyte material as a powder.

The powder of the precursor thus obtained was put in an alumina crucible, which was then placed in an electric furnace (HT16/17 manufactured by Chugai Engineering Co., Ltd.). The powder was heated to a temperature of 1500° C. at a rate of 200° C./hour in the air, maintained at the temperature for 4 hours, and then lowered to room temperature at a rate of 200° C./hour.

The fired product thus obtained was crushed using a supersonic jet crusher (PJM-200SP manufactured by Nippon Pneumatic Mfg. Co., Ltd.) at a crushing pressure of 0.6 MPa and a charging speed of 50 g/min. to give an electrolyte material as a powder having the composition formula of $Ba_{0.98}Zr_{0.79}Yb_{0.21}O_{3-\delta}$ was obtained.

The X-ray diffraction pattern of the powder of electrolyte material was measured to confirm that the powder was comprised of single phase of barium zirconate perovskite oxide. Further, the elemental mapping by an SEM-EDS method was performed under the following conditions using JSM-7000F manufactured by JEOL Ltd. to evaluate the segregation of ytterbium element.

The conditions of element mapping by the SEM-EDS method and the method of evaluating the segregation of the doping element M are as follows.

Conditions of Mapping
  Acceleration voltage: 10 kV
  Process time: 4
  Dead time: 30-40%
  Duel time: 100 μs
  Magnification: 10000 times
  Number of fields of view: 5
  Resolution: 512 by 384 (pixels)
  Number of scans: 10
  Characteristic X-rays used for analysis:
    Element A: Ba—La radiation for Ba; Sr—La radiation for Sr
    Element B: Zr—La radiation for Zr; Ce—La radiation for Ce
    Element M: Yb—Ma radiation for Yb; Y—La radiation for Y Evaluation Method of Segregation of Element M The resolution of the element mapping data obtained under the condition of a resolution of 512 by 384 (pixels) was converted to a resolution of 128 by 96 (pixels); then the region where 5 or more of the pixels each having a value of 0.6 or more were each in contact with another with its side was regarded as a segregation region of the element wherein the value was obtained by dividing the characteristic X-ray intensity of the element M in each pixel in the mapping data by the maximum X-ray intensity of the element M in the mapping data; and the integer value obtained by rounding the average value of the number of segregation regions in five fields of view was taken as the number of segregation regions of element M.

The pixel refers to the minimum pixel that constitutes the mapping data. In the mapping data having a resolution of 128 by 96 (pixels), the area of one pixel is 0.094 μm in length multiplied by 0.094 μm in width. Therefore, the area of one pixel is 0.0088 μm$^2$; the area of mapping data is 108

μm²; and the area of the segregation region of the element M is thus at least 0.0088×5=0.044 μm².

Measurement Conditions of Particle Size Distribution
   Measurement mode: MT-3000
   Upper limit of measurement: 1408 μm
   Lower limit of measurement: 0.021 μm
   Refractive index of particle: 2.07
   Shape of particle: Non-spherical
   Dispersion medium: Aqueous solution of sodium hexameta-phosphate having a concentration of 0.025% by weight
   Refractive index of solvent: 1.333

The "median value (D50) in the particle size distribution" determined based on the results of the particle size distribution measurement refers to a diameter of particle when the accumulative amount of the particles in the slurry reaches 50% on a volume basis. The slurry contains, for example, basic zirconium carbonate, barium carbonate or strontium carbonate, and the solid starting material containing the doping element M, and in addition, reaction products or complexes thereof: however, these particles were not distinguished from each other in the measurement. Thus, the median value (D50) in the particle size distribution means a diameter of particle when the accumulative amount of the particles in the slurry occupies 50% of the total particles on a volume basis in the particle size distribution measurement.

Measurement Conditions of Powder X-Ray Diffraction Pattern

The powder X-ray diffraction patterns of both the precursor for an electrolyte material and the electrolyte material were measured under the following conditions.
   Optical system: parallel beam optical system (long slit: PSA200/resolution: 0.057°)
   Tube voltage: 50 kV
   Current: 300 mA
   Measurement method: continuous scan
   Measurement range (2θ): 10°-60°
   Sampling width: 0.04°
   Scan speed: 5°/min.

The main diffraction line in the powder X-ray pattern refers to one having the highest diffraction intensity among the diffraction lines derived from the specific raw material.

The obtained powder of electrolyte material was molded into a column at a pressure of 190 MPa with a cold isostatic press (CPP-PS200 manufactured by NPa System Co., Ltd.), and then sintered at a temperature of 1700° C. for 24 hours in the atmosphere. The obtained sintered body was processed into a pellet having a thickness of 1 mm. Silver paste (manufactured by Shoei Chemical Inc.) was applied to the central part of both sides of the pellet in the form of a disk having a diameter of 10 mm, and then baked to prepare a cell for evaluation of proton conductivity.

The proton conductivity of the cell was evaluated as follows. A mixed gas of nitrogen and hydrogen having a volume ratio of 4% was heated to 20° C. While the mixed gas was supplied in the neighborhood of the evaluation cell, the resistance value of the cell was measured at 600° C. with an electrochemical measurement system (VSP-300 manufactured by Bio-Logic Science Instruments) by an AC impedance method. The proton conductivity was calculated from the obtained resistance value.

Example 2

60.61 g of barium carbonate, 69.58 g of basic zirconium carbonate and 19.80 g of ytterbium carbonate (manufactured by Wako Pure Chemical Industries, Ltd., having a purity of 64.1% by weight in terms of $Yb_2O_3$, the same hereinafter) were each weighed. These solid starting materials were put in water and stirred to prepare a slurry. The slurry was dispersed, crushed and mixed at a rotation speed of 180 rpm for 90 minutes, and otherwise in the same manner as in Example 1, a precursor for an electrolyte material and an electrolyte material having a composition formula $Ba_{0.98}Zr_{0.79}Yb_{0.21}O_{3-\delta}$ were obtained. Table 1 shows the results of evaluation of the precursor and the electrolyte material thus obtained.

Example 3

66.13 g of barium carbonate, 76.92 g of basic zirconium carbonate and 7.95 g yttrium oxide (manufactured by Wako Pure Chemical Industries, Ltd., having a purity of 99.7% by weight, the same hereinafter) were each weighed. These solid starting materials were put in water and stirred to prepare a slurry. The slurry was dispersed, crushed and mixed at a rotation speed of 180 rpm for 110 minutes, and otherwise in the same manner as in Example 1, a precursor for an electrolyte material and an electrolyte material having a composition formula $Ba_{0.98}Zr_{0.79}Y_{0.21}O_{3-\delta}$ were obtained. Table 1 shows the results of evaluation of the precursor and the electrolyte material thus obtained.

Example 4

66.13 g of barium carbonate, 75.92 g of basic zirconium carbonate and 7.95 g of yttrium oxide were each weighed. These solid starting materials were put in water and stirred to prepare a slurry. The slurry was dispersed, crushed and mixed at a rotation speed of 180 rpm for 60 minutes, and otherwise in the same manner as in Example 1, a precursor for an electrolyte material and an electrolyte material having a composition formula $Ba_{0.98}Zr_{0.79}Y_{0.21}O_{3-\delta}$ were obtained. Table 1 shows the results of evaluation of the precursor and the electrolyte material thus obtained.

Example 6

61.47 g of barium carbonate, 70.56 g of basic zirconium carbonate and 17.97 g yttrium carbonate (manufactured by Wako Pure Chemical Industries, Ltd., having a purity 41.0% by weight in terms of $Y_2O_3$) were each weighed. These solid starting materials were put in water and stirred to prepare a slurry. The slurry was dispersed, crushed and mixed at a rotation speed of 180 rpm for 130 minutes, and otherwise in the same manner as in Example 1, a precursor for an electrolyte material and an electrolyte material having a composition formula $Ba_{0.98}Zr_{0.79}Y_{0.21}O_{3-\delta}$ were obtained. Table 1 shows the results of evaluation of the precursor and the electrolyte material thus obtained.

Example 6

68.26 g of barium carbonate, 45.12 g of basic zirconium carbonate, 22.28 g of cerium oxide (manufactured by Wako Pure Chemical Industries, Ltd., having a purity 93.1% by weight) and 14.33 g of ytterbium oxide were each weighed. These solid starting materials were put in water and stirred to prepare a slurry. The slurry was dispersed, crushed and mixed at a rotation speed of 180 rpm for 120 minutes, and otherwise in the same manner as in Example 1, a precursor for an electrolyte material and an electrolyte material having a composition formula $Ba_{0.97}Zr_{0.48}Ce_{0.34}Yb_{0.21}O_{3-\delta}$ were obtained. Table 1 shows the results of evaluation of the precursor and the electrolyte material thus obtained.

Example 7

62.43 g of barium carbonate, 81.19 g of basic zirconium carbonate and 6.38 g ytterbium oxide were each weighed. These solid starting materials were put in water and stirred to prepare a slurry. The slurry was dispersed, crushed and mixed at a rotation speed of 180 rpm for 130 minutes, and otherwise in the same manner as in Example 1, a precursor for an electrolyte material and an electrolyte material having a composition formula $Ba_{0.98}Zr_{0.90}Yb_{0.10}O_{3-\delta}$ were obtained. Table 1 shows the results of evaluation of the precursor and the electrolyte material thus obtained.

Example 8

61.55 g of barium carbonate, 74.49 g of basic zirconium carbonate and 13.62 g ytterbium oxide were each weighed. These solid starting materials were put in water and stirred to prepare a slurry. The slurry was dispersed, crushed and mixed at a rotation speed of 180 rpm for 120 minutes, and otherwise in the same manner as in Example 1, a precursor for an electrolyte material and an electrolyte material having a composition formula $Ba_{0.93}Zr_{0.79}Yb_{0.21}O_{3-\delta}$ as were obtained. Table 1 shows the results of evaluation of the precursor and the electrolyte material thus obtained.

Example 9

65.16 g of barium carbonate, 65.39 g of basic zirconium carbonate, 6.22 g of cerium oxide and 13.60 g ytterbium oxide were each weighed. These solid starting materials were put in water and stirred to prepare a slurry. The slurry was dispersed, crushed and mixed at a rotation speed of 180 rpm for 120 minutes, and otherwise in the same manner as in Example 1, a precursor for an electrolyte material and an electrolyte material having a composition formula $Ba_{0.98}Zr_{0.69}Ce_{0.10}Yb_{0.21}O_{3-\delta}$ were obtained. Table 1 shows the results of evaluation of the precursor and the electrolyte material thus obtained.

Comparative Example 1

86.64 g of barium carbonate, 45.17 g of zirconium oxide (manufactured by Wako Pure Chemical Industries, Ltd., having a purity of 97.0% by weight) and 18.19 g of ytterbium oxide were each weighed. These solid starting materials were put in water and stirred to prepare a slurry. The slurry was dispersed, crushed and mixed at a rotation speed of 180 rpm for 60 minutes, and otherwise in the same manner as in Example 1, a precursor for an electrolyte material and an electrolyte material having a composition formula $Ba_{0.98}Zr_{0.79}Yb_{0.21}O_{3-\delta}$ were obtained. Table 1 shows the results of evaluation of the precursor and the electrolyte material thus obtained.

Comparative Example 2

66.13 g of barium carbonate, 75.92 g of basic zirconium carbonate and 7.95 g of yttrium oxide were each weighed. These solid starting materials were put in water and stirred to prepare a slurry. The slurry was dispersed, crushed and mixed at a rotation speed of 180 rpm for 30 minutes to obtain a slurry of a precursor for an electrolyte material having a median value (D50) in the particle size distribution of 1.1 μm, and otherwise in the same manner as in Example 1, the precursor for an electrolyte material and the electrolyte material having a composition formula $Ba_{0.98}Zr_{0.79}Y_{0.21}O_{3-\delta}$ were obtained. Table 1 shows the results of evaluation of the precursor and the electrolyte material thus obtained.

Comparative Example 3

63.61 g of barium carbonate, 73.03 g of basic zirconium carbonate and 13.36 g of ytterbium oxide were each weighed. These solid starting materials were crushed and mixed for 60 seconds using a dry crusher (Sample Mill SK-M10 manufactured by Kyoritsu Riko Co., Ltd.) to obtain a precursor for an electrolyte material having a median value in the particle size distribution of 15 μm. The precursor was then processed in the same manner as in Example 1 to obtain an electrolyte material having a composition formula $Ba_{0.98}Zr_{0.79}Yb_{0.21}O_{3-\delta}$. Table 1 shows the results of evaluation of the precursor and the electrolyte material thus obtained.

Comparative Example 4

60.61 g of barium carbonate, 69.58 g of basic zirconium carbonate and 19.80 g of ytterbium carbonate were each weighed. These solid starting materials were crushed and mixed for 60 seconds using a dry crasher (Sample Mill SK-M10 manufactured by Kyoritsu Riko Co., Ltd.) to obtain a precursor for an electrolyte material having a median value (D50) in the particle size distribution of 16 μm. The precursor was then processed in the same manner as in Example 1 to obtain an electrolyte material having a composition formula $Ba_{0.98}Zr_{0.79}Yb_{0.21}O_{3-\delta}$. Table 1 shows the results of evaluation of the precursor and the electrolyte material thus obtained.

Comparative Example 5

86.64 g of barium carbonate, 45.17 g of zirconium oxide and 18.19 g of ytterbium oxide were each weighed. These solid starting materials were put in water and stirred to prepare a slurry. The slurry was dispersed, crushed and mixed at a rotation speed of 180 rpm for 150 minutes, and otherwise in the same manner as in Example 1, a precursor for an electrolyte material and an electrolyte material having a composition formula $Ba_{0.98}Zr_{0.79}Yb_{0.21}O_{3-\delta}$ were obtained. Table 1 shows the results of evaluation of the precursor and the electrolyte material thus obtained.

| | Starting Material | | | Mixing | | D50 of Precursor for Electrolyte Material (μm) |
|---|---|---|---|---|---|---|
| | A Source | Zr source (and Ce Source) | M Source | Mixing Method | Mixing Conditions | |
| Example 1 | barium carbonate | basic zirconium carbonate | ytterbium oxide | wet bead mill | 180 rpm/120 min | 0.52 |
| Example 2 | barium carbonate | basic zirconium carbonate | ytterbium carbonate | wet bead mill | 180 rpm/90 min | 0.52 |
| Example 3 | barium carbonate | basic zirconium carbonate | yttrium oxide | wet bead mill | 180 rpm/110 min | 0.51 |
| Example 4 | barium carbonate | basic zirconium carbonate | yttrium oxide | wet bead mill | 180 rpm/60 min | 0.65 |
| Example 5 | barium carbonate | basic zirconium carbonate | yttrium carbonate | wet bead mill | 180 rpm/130 min | 0.49 |
| Example 6 | barium carbonate | basic zirconium carbonate and cerium oxide | ytterbium oxide | wet bend mill | 180 rpm/120 min | 0.32 |
| Example 7 | bariom carbonate | basic zirconium carbonate | ytterbium oxide | wet bead mill | 180 rpm/130 min | 0.51 |
| Example 8 | barium carbonate | basic zirconium carbonate | ytterbium oxide | wet bead mill | 180 rpm/120 min | 0.52 |
| Example 9 | barium carbonate | basic zirconium carbonate and cerium oxide | ytterbium oxide | wet bead mill | 180 rpm/120 min | 0.46 |
| Comparative 1 | barium carbonate | zirconium oxide | ytterbium oxide | wet bead mill | 180 rpm/60 min | 0.52 |
| Comparative 2 | barium carbonate | basic zirconium carbonate | yttrium oxide | wet bead mill | 180 rpm/30 min | 1.1 |
| Comparative 3 | barium carbonate | basic zirconium carbonate | ytterbium oxide | sample mill | 60 sec | 15 |
| Comparative 4 | barium carbonate | basic zirconium carbonate | ytterbium carbonate | sample mill | 60 sec | 16 |
| Comparative 5 | barium carbonate | zirconium oxide | ytterbium oxide | wet bead mill | 180 rpm/150 min | 0.45 |

| | XRD | | SEM-EDS | |
|---|---|---|---|---|
| | Intensity Ratio of Precursor for Electrolyte Material M/A (Note 1) | Heterogeneous phase in Electrolyte Material (Note 2) | Number of Segregation Regions of Element M (Note 3) | Electric Properties Proton Conductivity of Sintered Body (mS/cm) |
| Example 1 | ○ (0%) | ○ | ○ (1) | 3.5 |
| Example 2 | ○ (0%) | ○ | ○ (0) | 4.1 |
| Example 3 | ○ (0%) | ○ | ○ (0) | — |
| Example 4 | ○ (2.7%) | ○ | ○ (0) | — |
| Example 5 | ○ (0%) | ○ | ○ (0) | — |
| Example 6 | ○ (0%) | ○ | ○ (1) | — |
| Example 7 | ○ (0%) | ○ | ○ (0) | — |
| Example 8 | ○ (0%) | ○ | ○ (1) | — |
| Example 9 | ○ (0%) | ○ | ○ (1) | — |
| Comparative 1 | × (37%) | ○ | × (4) | 2.7 |
| Comparative 2 | × (11%) | × | × (3) | — |
| Comparative 3 | × (44%) | × | × (12) | — |
| Comparative 4 | ○ (0%) | × | × (10) | — |
| Comparative 5 | × (33%) | ○ | × (2) | 2.8 |

(Note 1)
The cases where the ratio of intensity of the main diffraction lines (M source/A source) was 3% or less were marked with ○, and the other cases were marked with ×. The ratios are shown in parentheses.

(Note 2)
The cases where the XRD pattern of the electrolyte material consisted only of barium zirconate perovskite oxide were marked with ○, and the other cases were marked with ×.

(Note 3)
Based on the mapping data, the number of segregated regions of element M was counted, and the average value of the number of segregated regions in five fields of view was rounded to an integer. The case where the integer obtained was 1 or less was marked with ○, and the case where the integer obtained was 2 or more was marked with ×. The integers obtained are shown in parentheses.

As shown in Examples 1 to 9 in Table 1, when basic zirconium carbonate was used as the starting material for the B source, the segregation of ytterbium (Yb) or yttrium (Y) as the element M was not observed. On the other hand, as shown in Comparative Example 1, when an oxide was used as the B source, a large amount of segregation was observed.

The reason why the segregation of the element M was not observed in Examples 1 to 9 was that the starting materials were mechanochemically reacted by using the basic zirconium carbonate as the B source.

However, as shown in Comparative Example 3, even when basic zirconium carbonate is used as a starting material for the B source, and when the second condition is not fulfilled, that is, in the case the D50 of the obtained precursor is 1 μm or more, a large amount of segregation of ytterbium, the element M, is observed. As described above, the reduction of the segregation of the element M achieved by the invention is not derived solely from the raw materials used, but is the result of the mechanochemical reaction of the starting materials while they are ground and mixed.

Also as shown in Comparative Example 4, when the obtained precursor fulfills the first condition, but does not fulfill the second condition, that is, when the precursor has a D50 of 1 μm or more, a large amount of Yb segregation is observed in the electrolyte material obtained therefrom. That is, the method of the invention requires that the solid starting materials be ground and mixed so that the resulting precursor has a D50 of 1 μm or less in order that the segregation of the element M is to be reduced in the electrolyte material.

As shown in Example 4 and Comparative Example 2, in order for the mechanochemical reaction to contribute to the reduction of the segregation of the element M, as described above, the method of the invention also requires that the ratio of the intensity of the main diffraction line of the A source to the intensity of the main diffraction line of the M source in the X-ray diffraction of the precursor is 3% or less.

Further, as shown in the results of Example 1 and Example 2 as compared with Comparative Example 1 and Comparative Example 5, when the number of segregated regions of the element M is 2 or more, no difference in proton conductivity is confirmed in the obtained electrolyte materials. However, it is confirmed that the obtained electrolyte material is improved in proton conductivity when the number of segregated regions is 1 or less. Thus, according to the invention, the number of segregated regions of the element M in the electrolyte material is preferably 1 or less so that it is superior in proton conductivity.

The invention claimed is:

1. A method for producing a precursor for an electrolyte material for a solid oxide fuel cell comprising a perovskite oxide comprising at least one element A selected from the group consisting of Ba and Sr, an element Zr, at least one element M selected from the group consisting of Y and Yb, and oxygen, the method comprising:
when obtaining a precursor by grinding and mixing starting solid materials composed of basic zirconium carbonate as a starting material of the element Zr, and a first and a second solid starting material containing the element A and the element M, respectively, grinding and mixing the starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less.

2. The method for producing a precursor for an electrolyte material for a solid oxide fuel cell according to claim 1, wherein the perovskite oxide is represented by the composition formula (I):

$$A_aZr_{1-x}M_xO_{3-\delta}$$

wherein the element A is at least one element selected from the group consisting of Ba and Sr, the element M is at least one element selected from the group consisting of Y and Yb, and a and x are each a number fulfilling the conditions: 0.90≤a≤1.05 and 0.05≤x≤0.3, respectively.

3. A method for producing an electrolyte material for a solid oxide fuel cell comprising a perovskite oxide comprising at least one element A selected from the group consisting of Ba and Sr, an element Zr, at least one element M selected from the group consisting of Y and Yb, and oxygen, the method comprising:
when obtaining a precursor by grinding and mixing solid starting materials composed of basic zirconium carbonate as a starting material of the element Zr, and a first and a second solid starting material containing the element A and the element M, respectively, grinding and mixing the starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less, and
firing and pulverizing the resulting precursor.

4. The method for producing an electrolyte material for a solid oxide fuel cell according to claim 3, wherein the perovskite oxide is represented by the composition formula (I):

$$A_aZr_{1-x}M_xO_{3-\delta}$$

wherein the element A is at least one element selected from the group consisting of Ba and Sr, the element M is at least one element selected from the group consisting of Y and Yb, and a and x are each a number fulfilling the conditions: 0.90≤a≤1.05 and 0.05≤x≤0.3, respectively.

5. An electrolyte material for a solid oxide fuel cell comprising a perovskite oxide represented by the composition formula (I):

$$A_aZr_{1-x}M_xO_{3-\delta}$$

wherein the element A is at least one element selected from the group consisting of Ba and Sr, the element M is at least one element selected from the group consisting of Y and Yb, and a and x are each a number fulfilling the conditions: 0.90≤a≤1.05 and 0.05≤x≤0.3, respectively,
wherein the number of segregation regions of the element M evaluated based on the element mapping data that is obtained by the SEM-EDS method is 1 or less,
wherein the number of segregation regions of the element M is determined as follows: the resolution of the element mapping data is converted to a resolution of 128 by 96 pixels wherein the area of 1 pixel is 0.094 μm by 0.094 μm; then the region where 5 or more of the pixels each having a value of 0.6 or more are each in contact with another with its side is regarded as a segregation region of the element M, wherein the value is obtained by dividing the characteristic X-ray intensity of the element M in each of the pixels in the mapping data by the maximum X-ray intensity of the element M in the mapping data, and the number of the segregation regions is counted.

6. A method for producing a precursor for an electrolyte material for a solid oxide fuel cell comprising a perovskite oxide comprising at least one element A selected from the group consisting of Ba and Sr, an element Zr, an element Ce, at least one element M selected from the group consisting of Y and Yb, and oxygen, the method comprising:
when obtaining a precursor by grinding and mixing solid starting materials composed of basic zirconium carbonate as a starting material of the element Zr, and a first, a second and a third solid starting material containing the element A, the element Ce and the element M, respectively, grinding and mixing the starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less.

7. The method for producing a precursor for an electrolyte material for a solid oxide fuel cell according to claim 6, wherein the perovskite oxide is represented by the composition formula (II):

$$A_aZr_{1-x-y}Ce_yM_xO_{3-\delta}$$

wherein the element A is at least one element selected from the group consisting of Ba and Sr, the element M is at least one element selected from the group consisting of Y and Yb, and a, x and y are each a number fulfilling the conditions: 0.90≤a≤1.05, 0.05≤x≤0.3, and 0.05≤y≤0.5, respectively.

8. A method for producing an electrolyte material for a solid oxide fuel cell comprising a perovskite oxide comprising at least one element A selected from the group consisting of Ba and Sr, an element Zr, an element Ce, at least one element M selected from the group consisting of Y and Yb, and oxygen, the method comprising:

when obtaining a precursor by grinding and mixing solid starting materials composed of basic zirconium carbonate as a starting material of the element Zr, and a first, a second and a third solid starting material containing the element A, the element Ce and the element M, respectively, grinding and mixing the starting materials until the intensity of main diffraction line derived from the starting material of the element M of the resulting precursor is 3% or less of the intensity of main diffraction line derived from the starting material of the element A of the resulting precursor in the X-ray diffraction pattern, and the median value (D50) in the particle size distribution of the resulting precursor is 1 μm or less, and firing and pulverizing the resulting precursor.

9. The method for producing an electrolyte material for a solid oxide fuel cell according to claim 8, wherein the perovskite oxide is represented by the composition formula (II):

$$A_aZr_{1-x-y}Ce_yM_xO_{3-\delta}$$

wherein the element A is at least one element selected from the group consisting of Ba and Sr, the element M is at least one element selected from the group consisting of Y and Yb, and a, x and y are each a number fulfilling the conditions: $0.90 \leq a \leq 1.05$, $0.05 \leq x \leq 0.3$, and $0.05 \leq y \leq 0.5$, respectively.

10. An electrolyte material for a solid oxide fuel cell comprising a perovskite oxide represented by the composition formula (II):

$$A_aZr_{1-x-y}Ce_yM_xO_{3-\delta}$$

wherein the element A is at least one element selected from the group consisting of Ba and Sr, the element M is at least one element selected from the group consisting of Y and Yb, and a, x and y are each a number fulfilling the conditions: $0.90 \leq a \leq 1.05$, $0.05 \leq x \leq 0.3$, and $0.05 \leq y \leq 0.5$, respectively, wherein the number of segregation regions of the element M evaluated based on the element mapping data obtained by the SEM-EDS method is 1 or less, wherein the number of segregation regions of the element M is determined as follows: the resolution of the element mapping data is converted to a resolution of 128 by 96 pixels wherein the area of 1 pixel is 0.094 μm by 0.094 μm; then the region where 5 or more of the pixels each having a value of 0.6 or more are each in contact with another with its side is regarded as a segregation region of the element M, wherein the value is obtained by dividing the characteristic X-ray intensity of the element M in each of the pixels in the mapping data by the maximum X-ray intensity of the element M in the mapping data, and the number of the segregation regions is counted.

11. The method for producing a precursor for an electrolyte material for a solid oxide fuel cell according to claim 1, wherein the precursor is obtained by grinding and mixing the starting solid materials to allow the starting materials to undergo a mechanochemical reaction.

12. The method for producing an electrolyte material for a solid oxide fuel cell according to claim 3, wherein the precursor is obtained by grinding and mixing the starting solid materials to allow the starting materials to undergo a mechanochemical reaction.

13. The method for producing a precursor for an electrolyte material for a solid oxide fuel cell according to claim 6, wherein the precursor is obtained by grinding and mixing the starting solid materials to allow the starting materials to undergo a mechanochemical reaction.

14. The method for producing an electrolyte material for a solid oxide fuel cell according to claim 8, wherein the precursor is obtained by grinding and mixing the starting solid materials to allow the starting materials to undergo a mechanochemical reaction.

* * * * *